Figure 4:
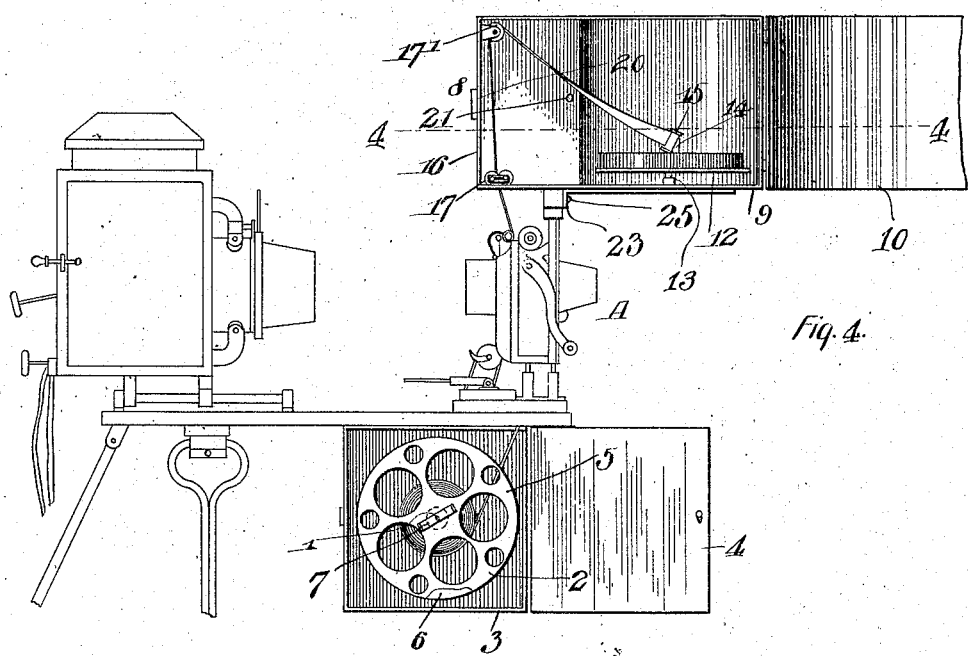

J. B. MERKEL & G. J. CARROLL.
FILM WINDING MECHANISM FOR MOVING PICTURE MACHINES.
APPLICATION FILED MAR. 19, 1910.

1,021,617.

Patented Mar. 26, 1912.

2 SHEETS—SHEET 1.

Inventors
Jacob B. Merkel and
George J. Carroll.

Witnesses

By Victor J. Evans
Attorney

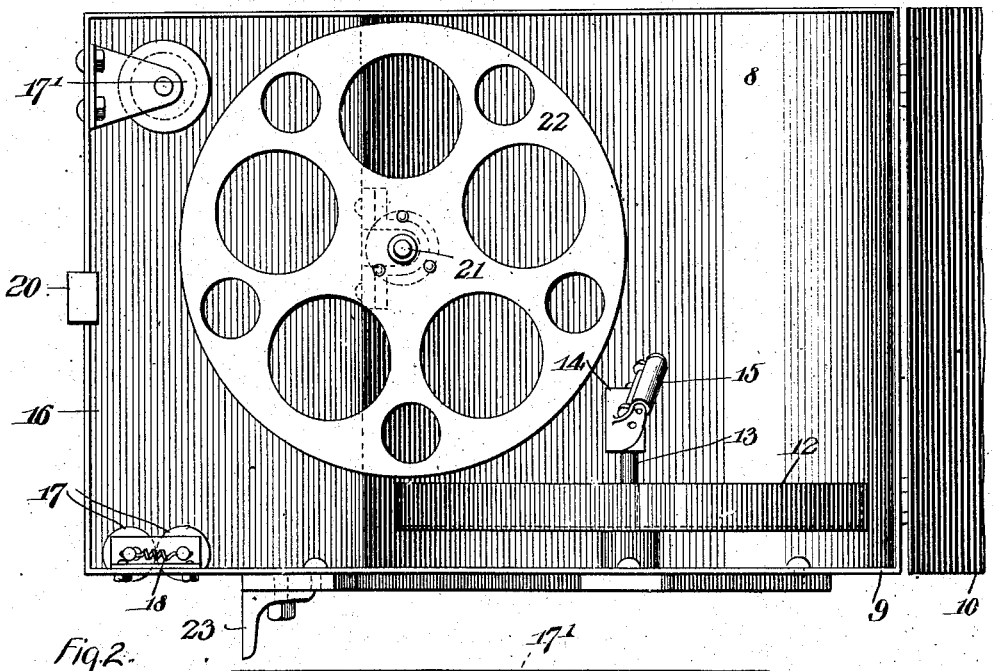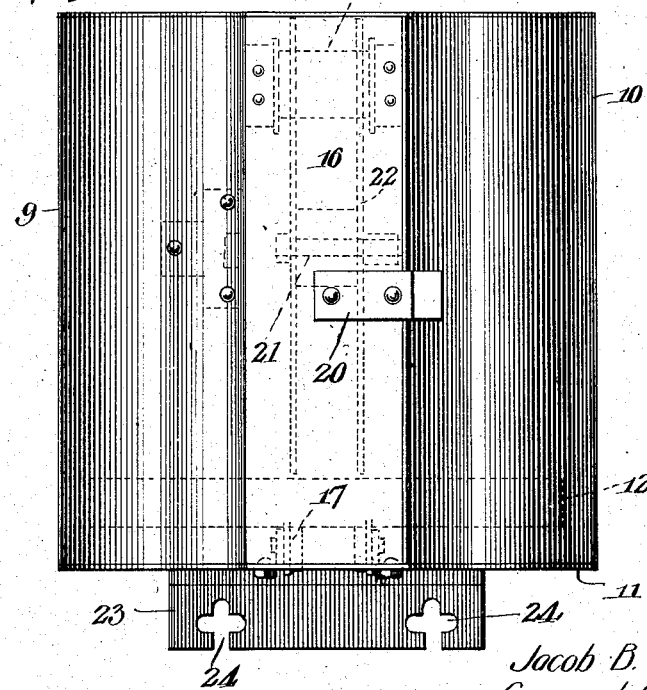

UNITED STATES PATENT OFFICE.

JACOB B. MERKEL AND GEORGE J. CARROLL, OF TAMAQUA, PENNSYLVANIA.

FILM-WINDING MECHANISM FOR MOVING-PICTURE MACHINES.

1,021,617.  Specification of Letters Patent.  Patented Mar. 26, 1912.

Application filed March 19, 1910. Serial No. 550,310.

*To all whom it may concern:*

Be it known that we, JACOB B. MERKEL and GEORGE J. CARROLL, citizens of the United States of America, residing at Tamaqua, in the county of Schuylkill and State of Pennsylvania, have invented new and useful Improvements in Film-Winding Mechanism for Moving-Picture Machines, of which the following is a specification.

This invention relates to film winding mechanism for motion picture machines, and it has for an object to provide mechanism which can be operated to obviate the usual winding and rewinding of the film before projection of the picture, means being employed whereby the ordinary film spools or reels can be used in the initial operation of the mechanism.

Another object of the invention is to employ an improved method of exhibiting moving picture films consisting of feeding the film through the machine from what may be termed the common trade-reel onto the receiving reel, which latter is formed of separable sections and constructed so as to dispose its front end innermost and then finally removing the wound film from the receiving reel and arranging it on the magazine reel from which the film can be drawn from the center to the said receiving reel.

In the drawings, forming a portion of this specification and in which like numerals of reference indicate similar parts in the several views:—

Figure 1:
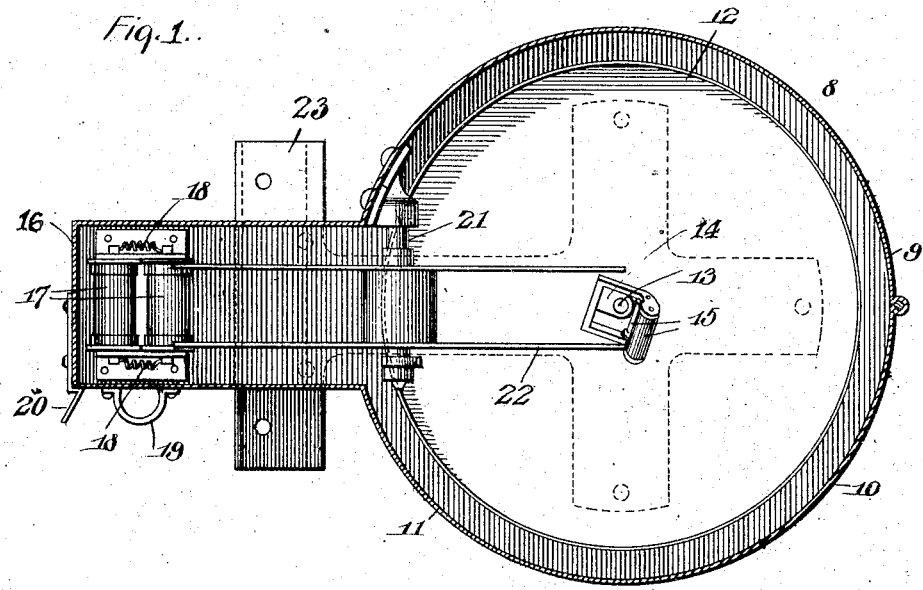

Figure 1 is a detail horizontal section taken on the line 4—4 of Fig. 4. Fig. 2 is a side elevation of the top magazine. Fig. 3 is a front view thereof. Fig. 4 is a side elevation of our improved mechanism showing the same applied to a moving picture machine, the closures for the upper and lower magazines being shown in their open positions and the film in place for reëxhibition.

The moving picture machine which is illustrated at A in Fig. 4 of the drawings, may be of any well known approved construction, but as illustrated, it is provided with the usual driven shaft 1 for the film spool or reel 2 which is mounted in a lower magazine 3. This magazine is provided with a hinged closure 4 so that the operator can readily gain access to the interior thereof when it is desired to remove the film spool. The said film spool is formed of separable sections 5 and 6 which are separated from each other by a hub 7.

The top magazine 8 is of a design constructed to accommodate our improved mechanism and it consists preferably of an inclosure 9 which is provided with a hinged closure 10. The inclosure is formed to provide a circular base 11 on which is revolubly mounted a film-guiding tray 12, a centrally disposed vertical shaft 13 being mounted on the base for supporting a bearing member 14 on which companion guide rollers 15 are mounted, the said rollers being disposed at an acute angle with respect to the base of the tray 12 for a purpose to be hereinafter described. The magazine is formed to provide a substantially rectangular portion 16 and on the bottom wall thereof a pair of yieldingly mounted film-guiding rollers 17 are mounted, the said rollers being movable relatively to and yieldingly engaged with each other preferably by springs 18. The closure 10 of the magazine 9 just described is provided with a suitable handle 19 and the front wall of the rectangular portion 16 of the magazine is provided with a spring clasp 20 adapted to engage the closure 10 to hold the same in its closed position. The magazine is provided with a shaft 21 which supports the film spool or reel 22 in the initial operation of the machine so that the film can be wound from such reel to the receiving reel 2 in the bottom magazine. The top magazine is provided with a bracket plate 23 having apertures 24 for receiving the clamping bolts 25 on the frame of the moving picture machine.

In the initial operation of the machine, assuming that the film has not been unwound from the reel 22 the front end of the film which of course is ordinarily disposed outermost is operatively associated with the mechanism of the moving picture machine and with the receiving spool or reel 2 so that when power is imparted to the shaft 1 of the lower magazine the reel 2 will be revolved to wind the film from the reel 22 onto the said reel 2. After the film has been shown as just described it will obviously appear that the front end of the film will be disposed innermost of all wound portions of the receiving reel. To obviate the rewinding of the film in order that the operator can immediately proceed with the operation of the moving picture machine we remove the said reel 2 from its magazine and separate the parts 6 and 7 from each other. We then remove the film entirely from this reel and substitute for the reel the reel 22 in the uppermost magazine, after which placing the film upon the lower reel in the film-guiding tray 12 of the upper magazine. As the film in its present form is wound so that its front end is innermost of all the wound portion the operator grasps the said innermost or front end portion and threads it through the guide rollers 15 and then over the roller 17' at the top of the portion 16 of the inclosure and then through the rollers 17, after which the film is of course operatively associated with the mechanism of the moving picture machine and such front end or terminal is then secured to the winding reel. After the film has been wound in this manner it may be again removed from the lower magazine and placed in the guiding tray 12 for immediate display. As stated, the film-guiding rollers 15 are disposed at an acute angle to the film-guiding tray or support 12. The rollers 17 are disposed horizontally and receive the film from the guide rollers 15 and 17' without twisting the film to any great extent, thus obviating undue mutilation thereof.

We claim:

1. Film-winding mechanism for moving picture machines comprising an upper magazine, a lower magazine, a reel of separable elements removably and revolubly mounted in the lower magazine, a reel support in the upper magazine, and a second reel support in the upper magazine and disposed at right angles to the first reel support therein for holding the film horizontally in coil form so that the film can be fed from its innermost wound portion to the reel in the lower magazine.

2. In film-winding mechanism, an upper magazine, a revolubly mounted film-supporting member located in the magazine and supporting the film in coil form, a reel support located forwardly of the first support and disposed at right angles to the axis of the support, a second magazine, and a winding reel in the second magazine and having its axis parallel to the second named support in the first named magazine and at right angles to the first named magazine.

3. In a moving picture machine, the combination of a reel supporting box, means arranged therein to support a reel, and means within the box to support a roll of film and permit the same to be unwound from its center.

In testimony whereof we affix our signatures in presence of two witnesses.

JACOB B. MERKEL.
GEORGE J. CARROLL.

Witnesses:
REBECCA S. BEARD,
SAMUEL R. BEARD.